United States Patent [19]

Atkins et al.

[11] Patent Number: 5,372,622
[45] Date of Patent: Dec. 13, 1994

[54] LARGE APERTURE DEVICE FOR CONTROLLING THICKNESS OF CONDUCTIVE COATINGS ON OPTICAL FIBERS

[75] Inventors: Robert M. Atkins, Millington; George E. Peterson, Warren, both of N.J.

[73] Assignee: AT&T Corp., Murray Hill, N.J.

[21] Appl. No.: 55,129

[22] Filed: Apr. 30, 1993

[51] Int. Cl.$^5$ .............................................. C03B 37/10
[52] U.S. Cl. ..................................... 65/382; 65/60.6; 65/60.1; 65/29; 65/425; 65/430; 324/636; 324/635; 427/9; 427/10
[58] Field of Search ............... 65/3.11, 3.12, 60.6, 65/60.1, 60.5, 29; 427/9, 10; 324/699, 632, 636, 635

[56] References Cited

U.S. PATENT DOCUMENTS

| | | | |
|---|---|---|---|
| 3,936,738 | 2/1976 | Maltby | 324/694 |
| 4,530,750 | 7/1985 | Aisenberg | 65/3.12 |
| 5,000,541 | 3/1991 | DiMarcello et al. | 350/96.3 |
| 5,013,130 | 5/1991 | Atkins et al. | 350/96.3 |
| 5,021,072 | 6/1991 | Atkins | 65/3.11 |
| 5,057,781 | 10/1991 | Akins et al. | 324/635 |
| 5,194,815 | 3/1993 | Maeno | 324/632 |
| 5,241,279 | 8/1993 | Boniort | 324/635 |
| 5,281,247 | 1/1994 | Aikawa | 65/12 |
| 5,296,011 | 3/1994 | Aikawa | 65/3.12 |

FOREIGN PATENT DOCUMENTS

| 2147631 | 3/1972 | Germany | 324/635 |
|---|---|---|---|

OTHER PUBLICATIONS

A New technique of Deformation Measurements Based on Microwave Resonate cavities, Besada, J. Lo et al, Sep./ 1980 Microwave Conference Warsaw Poland, pp. 288–292.

J. Y. Boniort, et al. "New Characterisation Techniques for Hermetic Carbon Coated Fibers", *ECOC-100C91*, Paris, France.

*Primary Examiner*—W. Gary Jones
*Assistant Examiner*—John Hoffmann
*Attorney, Agent, or Firm*—Oleg E. Alber

[57] ABSTRACT

Described is a new method and apparatus for measuring the thickness of a thin conductive coating deposited on a moving elongated dielectric body. Of special use is an application of a carbon coating on an optical fiber. The thickness of the conductive coating is measured by establishing an electromagnetic field in a resonator including an elongated unshielded helix and a pair of coupling loops. The helix is suspended between the coupling loops out of contact with either one of them. An electromagnetic energy is coupled into one loop as an input signal from a source of electromagnetic energy and coupled out from the other loop as an output signal. The difference between the magnitude of energy of an empty helix or of a helix with an uncoated body, and the helix with a coated body, is used for controlling the coating process. The inner diameter of the helix is large relative to the diameter of the elongated body being at least five times the diameter of the fiber and the spacing between the coils of the helix being equal to the cross-sectional dimension of the rod, wire or tubing making up the coil. The general principles stated herein can be applied over a wide range of radio frequencies, typically from about 100 MHz to 100 GHz, and can be applied to a wide range of coating configurations by appropriately selecting a frequency range and equipment that is compatible with the selected frequency range.

19 Claims, 5 Drawing Sheets

LARGE APERTURE DEVICE FOR CONTROLLING THICKNESS OF CONDUCTIVE COATINGS ON OPTICAL FIBERS

TECHNICAL FIELD

This invention relates to a method and apparatus used in manufacturing coated elongated insulators, such as optical fibers, and especially in the production of hermetically sealed optical fibers.

BACKGROUND OF THE INVENTION

An optical fiber, after it is drawn from a preform, is coated typically with at least one polymeric coating. These coatings significantly enhance the mechanical and optical properties of the fiber. However, polymeric coatings are generally permeable to environmental elements, such as water and hydrogen, which are deleterious to the fiber. The interaction of water with the surface of a silica fiber produces surface modifications which can reduce the strength of the fiber. Also, over a period of time, hydrogen can diffuse into an optical fiber and increase the optical loss in a signal carried by that optical fiber.

In order to prevent deleterious environmental elements from interacting with the fiber, a coating which acts as an impenetrable hermetic barrier to the environment is applied between the fiber and the polymeric coating. One such coating is a carbon coating applied to the outer surface of a silica cladding of the fiber. By inducing decomposition of a suitable carbon containing organic precursor gas, e.g., acetylene, a thin carbon film is formed on the surface of the fiber, for example, as described by F. V. DiMarcello et al., in U.S. Pat. No. 5,000,541 issued Mar. 19, 1991, which is incorporated herein by reference. For optimum results, the carbon coating must be applied in a particular thickness within close tolerances. If the coating is too thin, e.g., thinner than 200 Å, it does not sufficiently limit the penetration of the undesirable environmental elements. On the other hand, if it is too thick, e.g., greater than 2000 Å, fiber strength can be reduced by microcracks which can form in the carbon coating when the fiber is under high tensile force.

An example of a dynamic manufacturing method to measure and control the thickness of a hermetic coating being applied to an unjacketed optical fiber is disclosed in U.S. Pat. No. 5,013,130, issued to R. M. Atkins et al. on May 7, 1991, and in U.S. Pat. No. 5,057,781 issued to R. M. Atkins et al. on Oct. 15, 1991, each of which is incorporated herein by reference. This manufacturing method includes the steps of depositing a hermetic coating, e.g. carbon, on a moving optical fiber being drawn from a heated preform, and measuring contactlessly the thickness of the coating deposited on the optical fiber.

In FIG. 3 is shown a schematic representation of an exemplary prior art equipment for drawing an optical fiber, 20, from a preform, 24, coating fiber 20 first with a hermetic carbon coating and then with a polymer jacket, and finally winding the jacketed fiber on a take-up reel, 49. Fiber 20 is drawn from an end of preform 24 which is heated in a furnace, 25, to its melting or softening temperature. The fiber is drawn at a controlled steady temperature and velocity for producing fibers with uniform diameter. The drawn fiber 20 moves through a diameter gauge, 26, which produces a signal representing the diameter of the fiber. This signal is forwarded from gauge 26 via a lead, 27, to a detection, analysis and feedback processor, 28. The processor converts such a measurement signal into an analogous control signal which is used via a lead, 29, for adjusting the temperature of furnace 25, and via a lead, 54, to a capstan drive control, 55, for adjusting the drawing speed, as needed. A certain minimum fiber temperature is needed for deposition of a carbon coating on the surface of the fiber. Therefore, fiber 20, drawn from preform 24, moves through an optional heater, 30, for supplementing the residual heat in fiber 20, as needed, and through thermometer or pyrometer 31, for monitoring the temperature of the fiber 20 prior to a carbon-coating stage. A signal representing the temperature measured by thermometer 31 is applied via a lead, 32, to processor 28 which produces a control signal on a lead, 33, for controlling the temperature of heater 30.

Thereafter, fiber 20 enters a variable length, or telescoping, carbon-coating chamber 34, wherein a mixture of acetylene precursor gas together with chlorine and an inert gas, such as nitrogen, argon, or helium, is applied to the hot surface of moving fiber 20 for inducing decomposition of the acetylene precursor gas and deposition of a carbon coating uniformly on the periphery of the fiber. Signal indicative of the fiber temperature within chamber 34 is sent via lead 60 to processor 28 which may, if needed, send a signal via lead 33 to heater 30 for changing the temperature, or via lead 58 for changing the length of the chamber 34, or both. Signal indicative of the gas pressure in chamber 34 is transmitted via a lead, 62, to processor 28 which may send a control signal for changing the pressure via lead 56 to pressure regulator, 57. An indication of the concentration of the acetylene gas is forwarded from chamber 34 via a lead, 63, to processor 28. A control signal for changing the mixture of gases is transmitted from processor 28 via a lead, 64, to gas supply valves 65, 66 and 67. The gases are mixed in a manifold, 68, and delivered through pressure regulator 57 and supply line 40 to gas chamber 34. The gases exit gas chamber 34 by way of an exhaust fitting, 45.

The carbon coated fiber, upon exiting carbon-coating chamber 34, moves through a radio frequency resonator 35. The thickness of the carbon coating on the surface of the moving optical fiber 20 is measured in resonator 35 without physically contacting the unjacketed fiber.

Upon exiting from resonator 35, carbon coated fiber 20 moves on through a fiber jacketing stage. This stage includes one or more vessels, 46, filled with ultraviolet light curable liquid materials, and a set of lamps, 47, applying ultraviolet light for curing the liquid material on the fiber. The jacketed fiber is wound about a capstan drive, 48, and then onto reel 49 for storage. Signals indicative of the speed of capstan 48 and jacketed fiber 20 are sent to processor 28 via a lead, 61.

The carbon-coating thickness measurements, as disclosed in the above-mentioned Atkins et al. patents, are conducted utilizing resonator 35 which may have various configurations. In each of these variants the resonator includes a solid wall outside chamber, a radio frequency electromagnetic field is established within the resonator and the coated fiber passes through the resonator disturbing the field. The electromagnetic field is established in resonator 35 by an input signal from a source of radio frequency oscillations, 41. As the carbon-coated insulator is moved through the energized electromagnetic field, interaction of the conductive coating with the electromagnetic field or a component thereof induces transmission loss from input to output. An output signal is extracted from the electromagnetic field at a point where the output signal can be detected. The effective radio frequency conductance of the carbon coating is then determined from changes in the output signal with respect to a predetermined standard. Thickness of the coating is determined from the conductance data. From the thickness determination, signals are generated for dynamically controlling the coating process to maintain a desired thickness tolerance.

In FIG. 4 is shown a schematic representation of one version of prior art resonator 35 for operation in the radio frequency range. The resonator includes a cylindrical metal chamber, 36, and a conductive helical coil, 37, within the chamber. The coil is affixed at one end, 38, to chamber 36 and otherwise is separated from the walls of the chamber. An input signal, produced by fixed or swept frequency signal generator 41, is coupled into the resonator via coaxial line 42 by an input coupling loop 43. Input loop 43 is positioned inside of the resonator to energize a resonant electromagnetic field in response to the applied input signal. The frequency at which the helix is operable may be adjusted by means of a capacitor (not shown) connected between coaxial line 42 and coil 37. Power levels of the input signal typically can be in the range of from a fraction of a milliwatt to about 100 milliwatts. By energizing coil 37 with a radio frequency input signal, an electromagnetic field is established within and along coil 37. The introduction of a coated dielectric (a carbon coated optical fiber) into the resonator axially of coil 37 modifies both the resonance frequency and output power. As the carbon coated fiber 20 moves through the electromagnetic field, it absorbs power from it. Presence of coil 37 in chamber 36 tends to increase the electromagnetic field along the axis of the chamber, which coincides with the direction of movement of fiber 20 through the chamber. Power is extracted from the resonator by way of an output coupling loop, 50, positioned so that it interacts with the appropriate field where the field strength is sufficient to produce a useful output signal. The output signal extracted from the resonator is transmitted via coaxial line 52 to processor 28. The transmission response is related to conductance of the carbon coating. Processor 28 determines the thickness of the conductive carbon coating and, if needed, develops a signal for controlling the carbon deposition process.

A variant of a prior art resonator for measuring the thickness of a coating on an optical fiber is described by J. Y. Boniort et al. "New Characterization Techniques for Hermetic Carbon Coated Fibers", ECOC-100C 91, Paris, France. Shown in FIG. 5 is a resonator 70 having a thin elongated helical coil, 71, with a small central aperture held between two metallic end plates, 73 and 74, within a metallic outer cylinder, 72, providing an electromagnetic shield. The coil is connected at both ends to the metallic end plates. Input and output terminals, 75 and 76, respectively, are located at opposite ends of the coil. A radio frequency signal, is provided to input terminal 75 via line 77. The output signal is extracted from the resonator via output terminal 76, and could be sent via coaxial line 78 to a processor, such as processor 28 shown in FIG. 3. In the Boniort et al. system most of the electromagnetic energy is contained outside of the helix, that is between the helix and the outer cylinder. In this arrangement the oscillator signal source is not locked to the resonant transmission peak of the helix but is simply swept through the resonator. This makes a closed loop control system difficult to implement.

The measuring arrangements described by Atkins et al. and by Boniort et al. present certain other problems. One of the problems is that the resonator is opaque so that the fiber cannot be viewed. Furthermore, the opening through which the fiber passes is very small, e.g., 0.1–0.3 cm in diameter and typically only 0.1 cm. This makes fiber insertion difficult. The small size of the opening also increases the possibility of the fiber touching the walls of the opening during the manufacturing. Should the unprotected fiber rub against the walls of the opening, the fiber can be damaged or even break. Considering the diameter of the carbon-coated fiber and the fact that a length of the optical fiber between the preform and the jacketing stage is subject to oscillations transverse to the movement of the fiber along its longitudinal axis, such contact is quite likely.

SUMMARY OF THE INVENTION

These and other problems are solved by a new method and apparatus for measuring the thickness of a thin conductive coating deposited on a moving elongated dielectric body. Of special use is an application of a carbon coating on an optical fiber. The thickness of the conductive coating is measured by establishing an electromagnetic field in a resonator including an elongated unshielded helix and a pair of coupling loops. The helix is suspended between the coupling loops out of contact with either one of them. An electromagnetic energy is coupled into one loop as an input signal from a source of electromagnetic energy and coupled out from the other loop as an output signal. The difference between the magnitude of energy of an empty helix or of a helix with an uncoated body, and the helix with a coated body, is used for controlling the coating process. The inner diameter of the helix is large relative to the diameter of the elongated body being at least five times the diameter of the fiber and the spacing between the coils of the helix being equal to the cross-sectional dimension of the rod, wire or tubing making up the coil. The general principles stated herein can be applied over a wide range of radio frequencies, typically from about 100 MHz to 100 GHz, and can be applied to a wide range of coating configurations by appropriately selecting a frequency range and equipment that is compatible with the selected frequency range.

DETAILED DESCRIPTION

Figure 1:
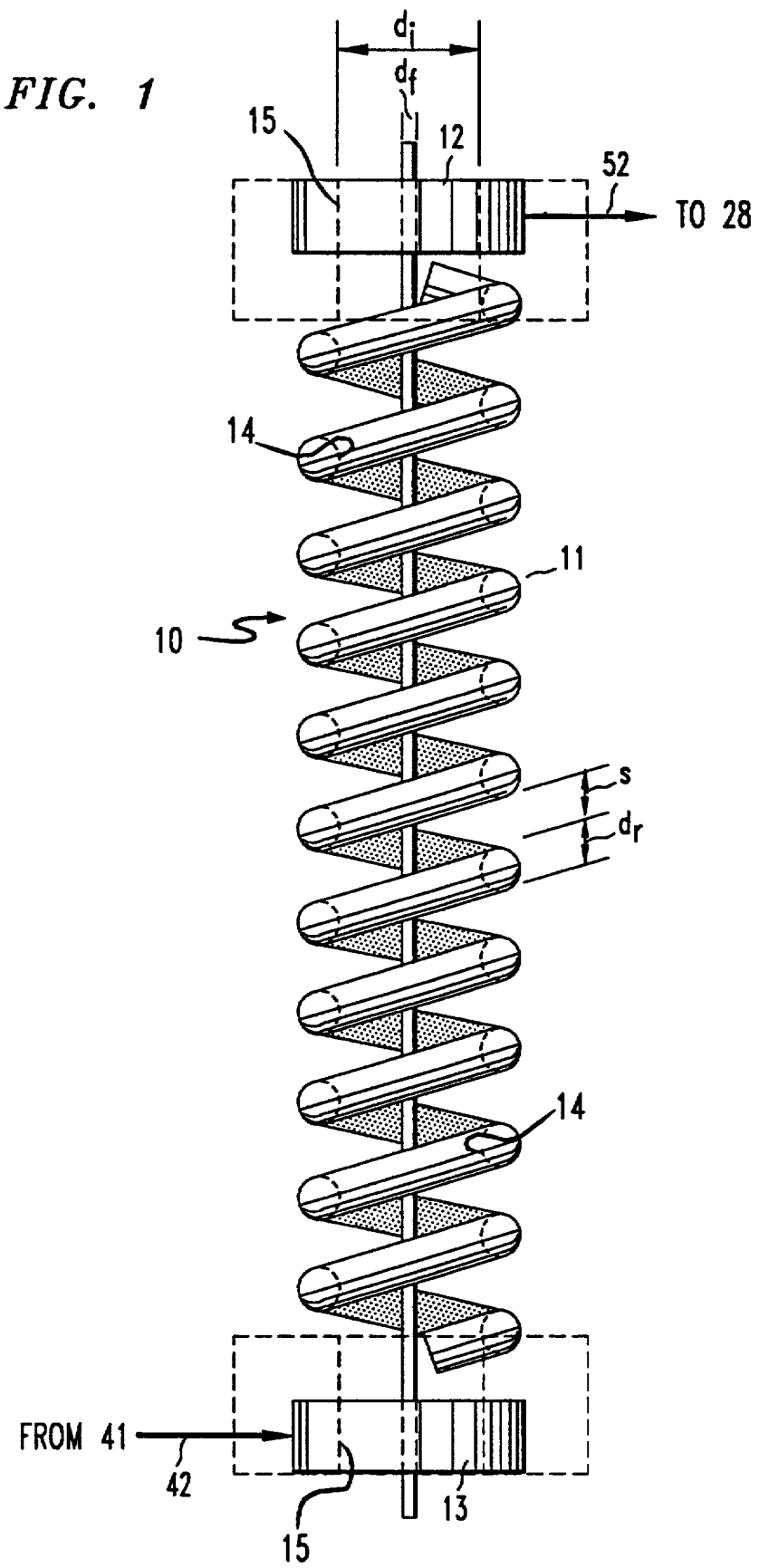
FIG. 1 is a schematic diagram of resonator with a helix arrangement according to this invention for measuring the thickness of a conductive coating on optical fiber.

In FIG. 1 is shown an embodiment of a resonator 10 useful for measuring thickness of a conductive coating which has been deposited on an optical fiber, for example, for use in the apparatus described with reference to FIG. 3. This resonator includes an unshielded helix 11 and coupling loops 12 and 13. The helix is formed by a plurality of turns of a conductive rod, wire or tubing wound in a helical manner forming helix 11 with a central aperture, 14. Each of coupling loops 12 and 13 is of a material having magnetic properties permitting coupling of a magnetic energy to the helix. Coupling loops 12 and 13 may be in a form of an annulus or a single coil of the coupling material. Each of the coupling loops has an opening 15 which is approximately of the same diameter as that of central aperture 14. Helix 11 is suspended between coupling loops 12 and 13 out of contact with either one. The suspension may be accomplished by means of a holder of a material which enables suspension of the helix between the loops without affecting the electromagnetic field applied by generator 41. Suitable materials would include ceramics and plastic materials. One variant of the holder is shown in phantom lines.

Helix 11 is essentially transparent and one can view a fiber passing through it. The coils of the helix are wound in a relatively loose manner permitting observation of a conductor threaded therethrough. The helix is designed with aperture 14 the diameter of which, di, is large relative to the diameter of the fiber, ds, so that electromagnetic energy is confined to the helix, and no shield is necessary. For optimum results the spacing, s, between individual coils would equal the cross-sectional dimension dr of the rod, wire, or tubing from which the coil was fabricated, while the inner diameter di of the helix should be at least five times the diameter df of the fiber. This gives transparency and large aperture. To reduce radiative losses, it is desirable to make the length of the helix at least five times the inner diameter of the helix.

Resonator 10 may be operable within a wide range of radio frequencies, such as from 100 MHz to 100 GHz, preferably from 100 MHz to 10 GHz. Optimal operating frequencies fall within a range of from 400 MHz to 5 GHz, with frequencies within a range of from 400 MHz to 3 GHz being most suitable.

Figure 2:
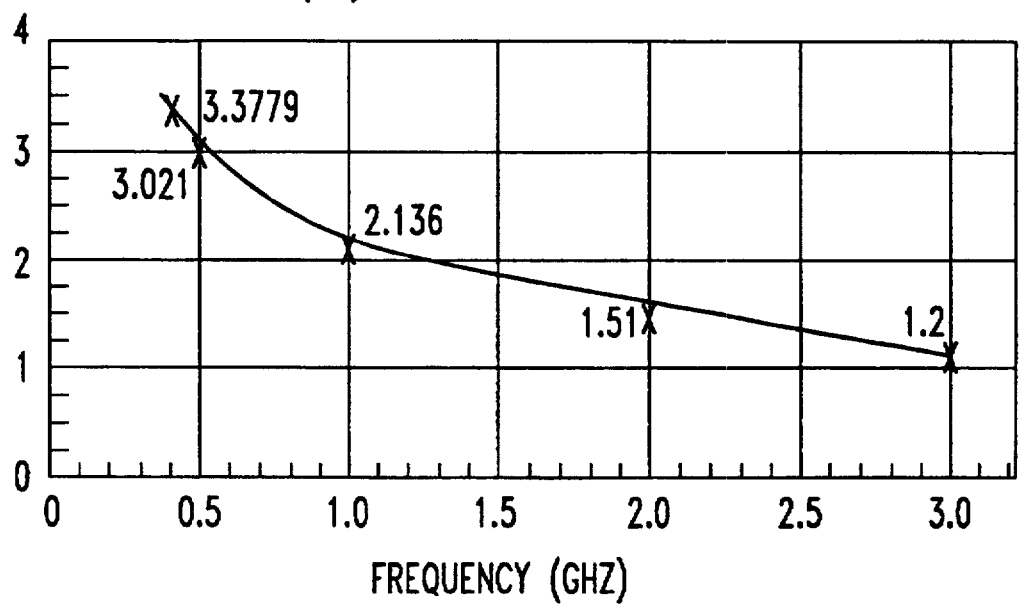
FIG. 2 is a plot of a size of an inner diameter in centimeters, of the helix shown in FIG. 1 versus the frequency in GHz at which the resonator is operable.

In FIG. 2 is shown a plot of an inner diameter in centimeters of the helix according to the invention versus the frequencies in GHz commonly used in measuring the thickness of the carbon coating on the fiber. The frequencies range from 0.4 GHz to 3 GHz and correspond with the inner diameters of from 3.8 cm to 1.2 cm, respectively. It is seen that with reduction in frequency, the size of the inner diameter quickly increases. Any further increase in the size of the coil would be possible but is not desirable because of the disproportionate size of the coil relative to the remainder of the apparatus. On the other hand, the size of less than 1.0–1.2 cm inner diameter could cause difficulties in threading the optical fiber through the coil axially thereof.

Figure 3:
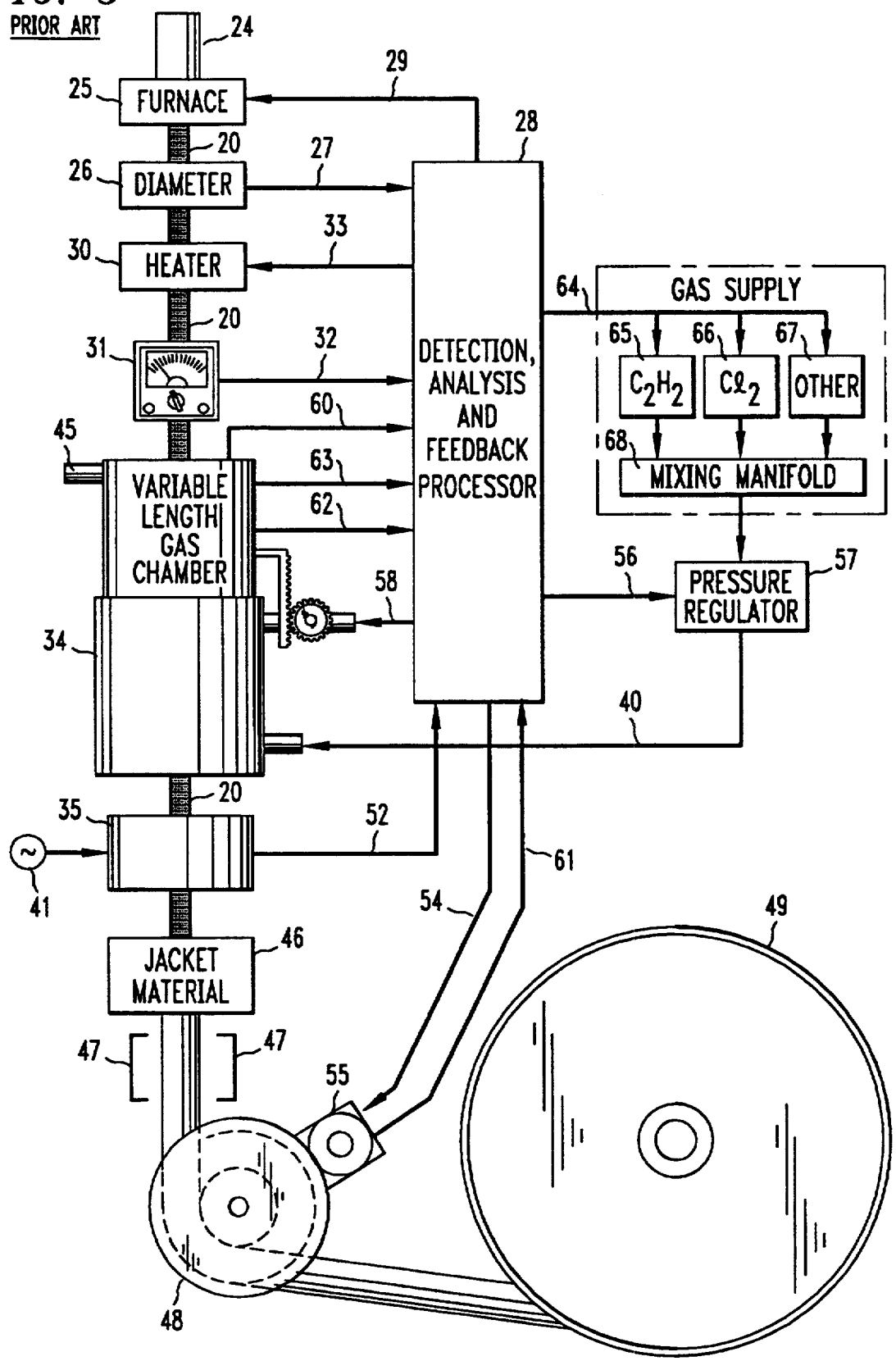
FIG. 3 is a schematic diagram of a prior art apparatus for drawing an optical fiber, for making measurements, and for controlling the drawing operation and the coating process.
Figure 6:
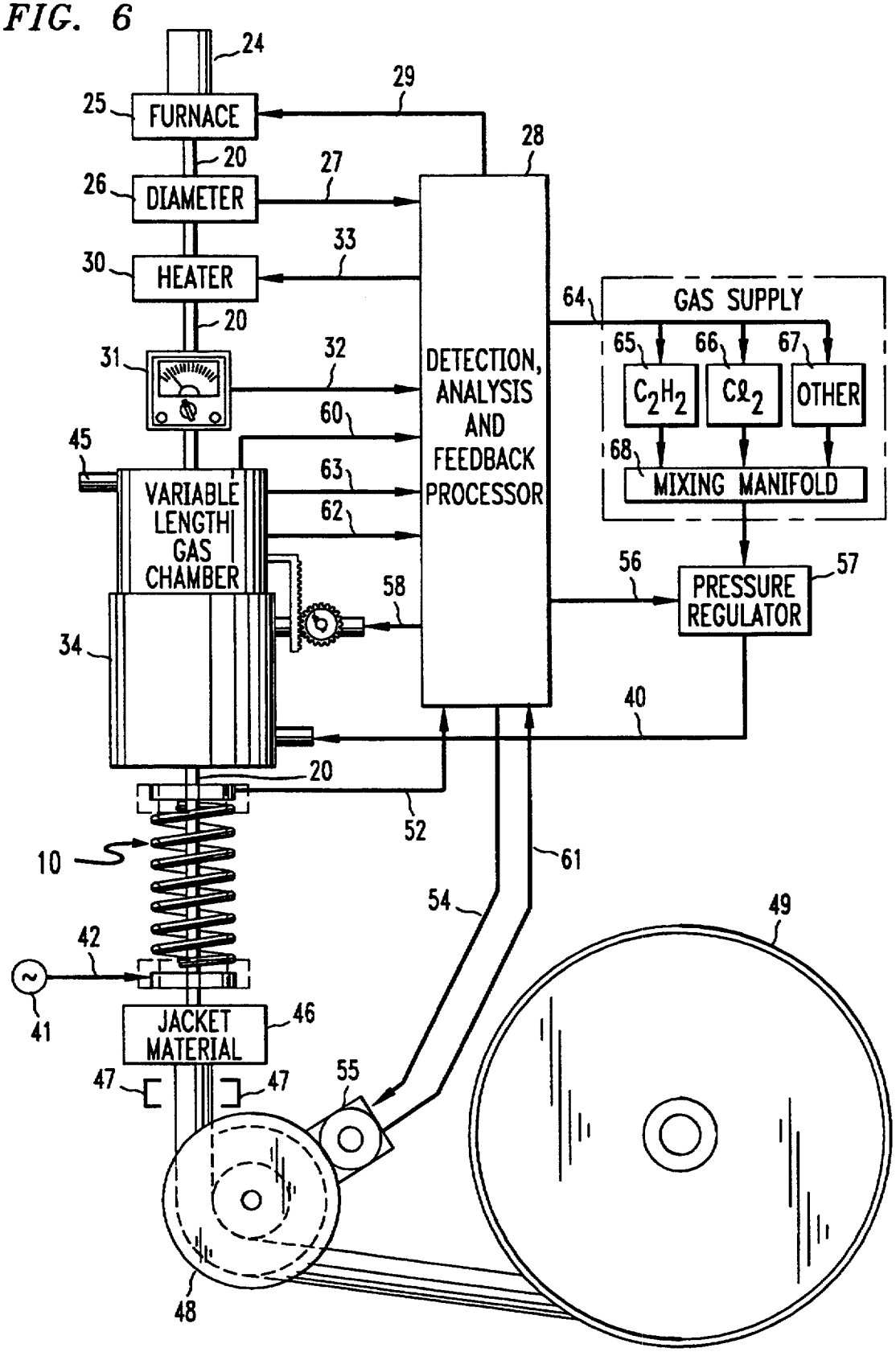
FIG. 6 is a schematic diagram of apparatus for fabricating an optical fiber with a conductive coating in which a resonator (10) described with reference to FIG. 1 is used in place of the resonator (35) described with reference to FIG. 3.

Resonator 10 can be inserted directly in place of resonator 35 in FIG. 3. FIG. 6 is a diagram of apparatus for fabricating optical fibers with a conductive coating, which is schematically represented in FIG. 3 of the drawings but in which resonator 10, described with reference to FIG. 1 of the drawings, is used in place of prior art resonator 35 described with reference to FIG. 3. Since the electromagnetic energy is confined to the helix, resonator 10 is stable so that close control is not needed. Nevertheless, an additional control system using S parameters (scattering parameters) can be employed to correct for frequency drifts due to temperature changes.

A two port device, such as resonator 10 of FIG. 1, can be characterized by S-parameters (scattering parameters). Such information is available on the IEEE bus from a network spectrum analyzer such as the HP 4196A TM. $S_{21}$ or $S_{12}$, which are the forward loss or reverse loss of the resonator, respectively, will show a sharp minimum in loss when the resonator is at resonance. The spectrum analyzer can be commanded, over the bus to scan over a prescribed frequency range, to determine $S_{21}$ over this range and set its frequency to minimize the transmission loss. Thus, the oscillator is exactly on the resonance peak of the resonator. The spectrum analyzer can perform this operation as often as one wishes, usually once every few seconds. The spectrum analyzer can then be commanded to display $S_{12}$ in a manner which is proportional to the resistance of the carbon coating on the fiber. It is also possible to use the $S_{12}$ value to control the fiber jacket coating process if desired.

The suitability of the helix for use in measuring the carbon coating on an optical fiber may be also determined by the size of $\beta A$ which is the product of the radius of the helix, A, and a parameter $\beta$ where $\beta = (4\pi^2 AN)/\lambda$, wherein $\lambda$ is the wavelength of operation and $N = (1/P)$, P being the pitch of the helix. If $\beta A > 1.5$, higher order modes with angular dependence are excited and if A becomes too large, the helix acts as an antenna and must be shielded. If $\beta A < 1$, the waves are little slowed (delayed) and intense electromagnetic fields are not produced in the helix. The helix acts as an antenna and must be shielded. However when $1 \leq \beta A \leq 1.5$, only the fundamental mode is dominant. The electromagnetic energy is concentrated in the helix to produce intense electromagnetic fields. The helix basically acts as a delay line and does not need to be shielded.

Helix 10 is designed so that $1 \leq \beta A \leq 1.5$, preferably so that $\beta A \approx 1.5$. This gives: 1) large opening (di), 2) no shield is needed, and 3) good stability. The upper limit of the (di) diameter for this case is $2\pi A = \lambda/2$. This case is the most useful for characterizing hermetic carbon coated fibers, and since there is an intense electromagnetic field in the helix no shield is needed. For comparison, the typical helices as mentioned in the Atkins patents and in the Boniort et al. article have been analyzed.

Figure 4:
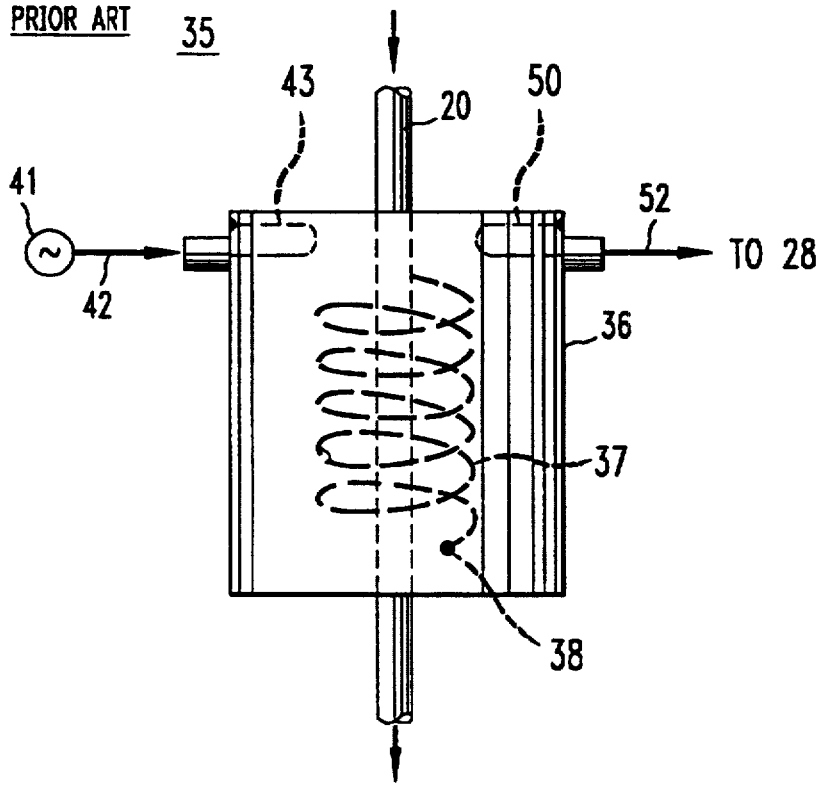
FIG. 4 is a schematic representation of one embodiment of a prior art arrangement for measuring the thickness of the conductive coating on the optical fiber.

Prior art resonator 35 of Atkins et al., such as represented in FIG. 4, is typically operable at a frequency of about 500 MHz. Resonator 35 has outer copper shield 36 with the cross-sectional area of about 6.5 $cm^2$, helix 37 is located within shield 36 and has an inside diameter of approximately 0.2 cm, a 0.63 cm pitch and 3.5 turns of copper wire. For this type of helix with A = 0.1 cm, N = 0.732/cm, and $\lambda$ = 60 cm, the $\beta A = 0.005$ $cm^2$, that is, $\beta A < 1$. Thus $\beta A$ is too small, and the microwave field is not compressed into the helix, requiring a shield. Even if the inside diameter of the helix is increased to 1.5 cm, $\beta A$ would still be equal only to 0.27 cm² so that a shield would be required.

Figure 5:
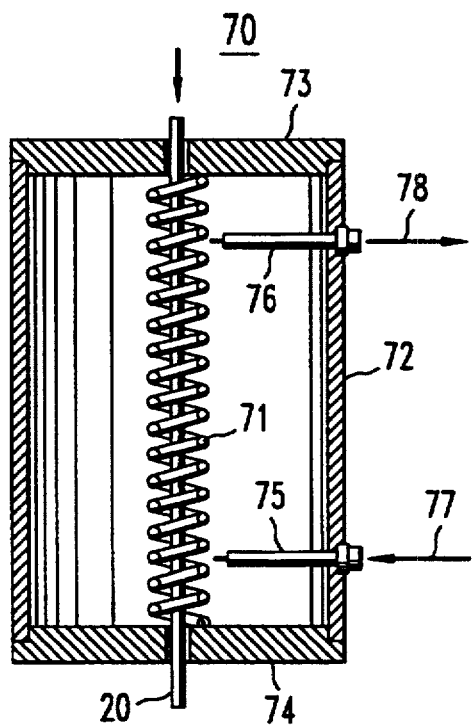
FIG. 5 is a schematic representation of another embodiment of the prior art arrangement for measuring the thickness of the conductive coating on the optical fiber.

Prior art resonator 70 of Boniort et al., represented in FIG. 5, is operable at a frequency of from 2 to 3 GHz at 1 mW. Chamber 72 has a metallic outer cylinder, helix 71, located within the chamber, has a small central aperture (0.3 cm ID, 0.2–0.3 cm pitch and is 7 cm long). For the four exemplary variants mentioned by Boniort et al., the $\beta A$ is too small, that is, $\beta A < 1$, as can be seen below, requiring a shield:

(1) For $A = 0.15$ cm, $N = 5/cm$, and $\lambda = 15$ cm, $\beta A = 0.2958$ cm²;
(2) For $A = 0.15$ cm, $N = 3.3/cm$, and $\lambda = 15$ cm, $\beta A = 0.1952$ cm²;
(3) For $A = 0.15$ cm, $N = 5/cm$, and $\lambda = 10$ cm, $\beta A = 0.4437$ cm²; and
(4) For $A = 0.15$ cm, $N = 3.3/cm$, and $\lambda = 10$ cm, $\beta A = 0.2928$ cm².

In each of these instances the resonator would require a shield, making the resonator unsuitable for observing the fiber through the coils of the resonator.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

We claim:

1. A process of fabricating an optical fiber comprising a core, a cladding, and a hermetic coating on the surface of the cladding, which comprises:
   a) drawing material from a heated end portion of an optical fiber preform having a core and a cladding material into an elongated optical fiber comprising a core and a cladding,
   b) coating the surface of the optical fiber with a continuous layer of conductive material in a thickness sufficient to hermetically seal the optical fiber while avoiding vulnerability of the conductive coating to cracking, and
   c) monitoring the thickness of the conductive material coating by means of a resonator operable within a frequency range of from 100 MHz to 100 GHz, said monitoring including:
      (i) establishing in the resonator an electromagnetic field with a frequency of oscillation in said range of from 100 MHz to 100 GHz,
      (ii) determining the magnitude of said electromagnetic field,
      (iii) introducing the coated optical fiber into the resonator and moving the coated optical fiber through and coaxially with the resonator, and
      (iv) in response to a change in the electromagnetic field due to the introduction of the coated optical fiber into the resonator generating a signal representative of the thickness of the conductive material on the optical fiber, wherein said monitoring is conducted by means of a resonator comprising an unshielded elongated helix an inner diameter of which is large relative to the diameter of the optical fiber, said helix being suspended between and out of contact with a pair of coupling loops of a material permitting coupling of the electromagnetic field to and from the helix, said electromagnetic energy being coupled out from one loop as an input signal to the helix and being coupled into the other loop as the signal representative of the thickness of the conductive material.

2. The process of claim 1, in which the helix is designed so that the spacing between individual coils is equal to the cross-sectional dimension of the material of the coil.

3. The process of claim 1, in which the inner diameter of the helix is at least five times the diameter of the coated fiber.

4. The process of claim 1, in which the length of the helix is made to be at least five times the inner diameter of the helix.

5. The process of claim 1, in which said resonator operates within a frequency range of from 400 MHz to 5 GHz.

6. The process of claim 1, in which said resonator is operated within a frequency range of from 400 MHz to 3 GHz.

7. The process of claim 6, in which the inner diameter of the coil ranges from 1.2 centimeters to 3.8 centimeters.

8. The process of claim 1, in which said helix is designed so that $1 \leq \beta A \leq 1.5$, where, A is the inner radius of the helix, $\beta = (4\pi^2 AN)/\lambda$, wherein $\lambda$ is the wavelength of the operation, and $N = (1/P)$, with P being the pitch of the helix.

9. The process of claim 1, in which said conductive coating comprises carbon coating.

10. A method of monitoring the thickness of a conductive coating on an elongated body of a dielectric material, which comprises
    establishing in an elongated resonator an electromagnetic field with a frequency of oscillation in a range of from 100 MHz to 100 GHz,
    determining the magnitude of said electromagnetic field,
    introducing into the resonator an elongated dielectric body having conductive coating thereon and moving said coated body through and coaxially with said resonator, and,
    in response to a change in the electromagnetic field, due to the introduction of said coated body into the resonator, generating a signal representative of the thickness of the conductive coating, in which
    said resonator comprises an unshielded elongated helix, an inner diameter of which is large relative to the diameter of the coated body, said helix is suspended between and out of contact with a pair of coupling loops of a material having magnetic properties permitting coupling of the electromagnetic field to the helix, said electromagnetic field being coupled out from one coupling loop as an input signal to the helix and being coupled into the other coupling loop as the signal representative of the thickness of the conductive coating.

11. The process of claim 10, in which the helix is designed so that the spacing between the individual coils is equal to the cross-sectional dimension of the material of the coil.

12. The process of claim 10, in which the inner diameter of the helix is at least five times the diameter of the coated fiber.

13. The process of claim 10, in which the length of the helix is made to be at least five times the inner diameter of the helix.

14. The process of claim 10, in which said resonator operates within a frequency range of from 400 MHz to 5 GHz.

15. The process of claim 10, in which said resonator is operated within a frequency range of from 400 MHz to 3 GHz.

16. The process of claim 15, in which the inner diameter of the coil ranges from 1.2 centimeters to 3.8 centimeters.

17. The process of claim 10, in which said helix is designed so that $1 \leq \beta A \leq 1.5$, wherein A is the inner radius of the helix, $\beta = (4\pi^2 AN)/\lambda$, wherein $\lambda$ is the wavelength of the operation, and $N = (1/P)$, with P being the pitch of the helix.

18. The process of claim 10, in which said conductive coating comprises carbon coating.

19. The process of claim 10, in which said elongated body of a dielectric material is an optical fiber.

* * * * *